Sept. 17, 1968

L. PEASE 3,401,725

REMOTE CONTROL PRE-SET SYSTEM

Filed March 22, 1965

INVENTOR.
Lionel Pease
BY
VW Secrest

Sept. 17, 1968   L. PEASE   3,401,725
REMOTE CONTROL PRE-SET SYSTEM
Filed March 22, 1965   11 Sheets-Sheet 2
Fig. 2
Fig. 3
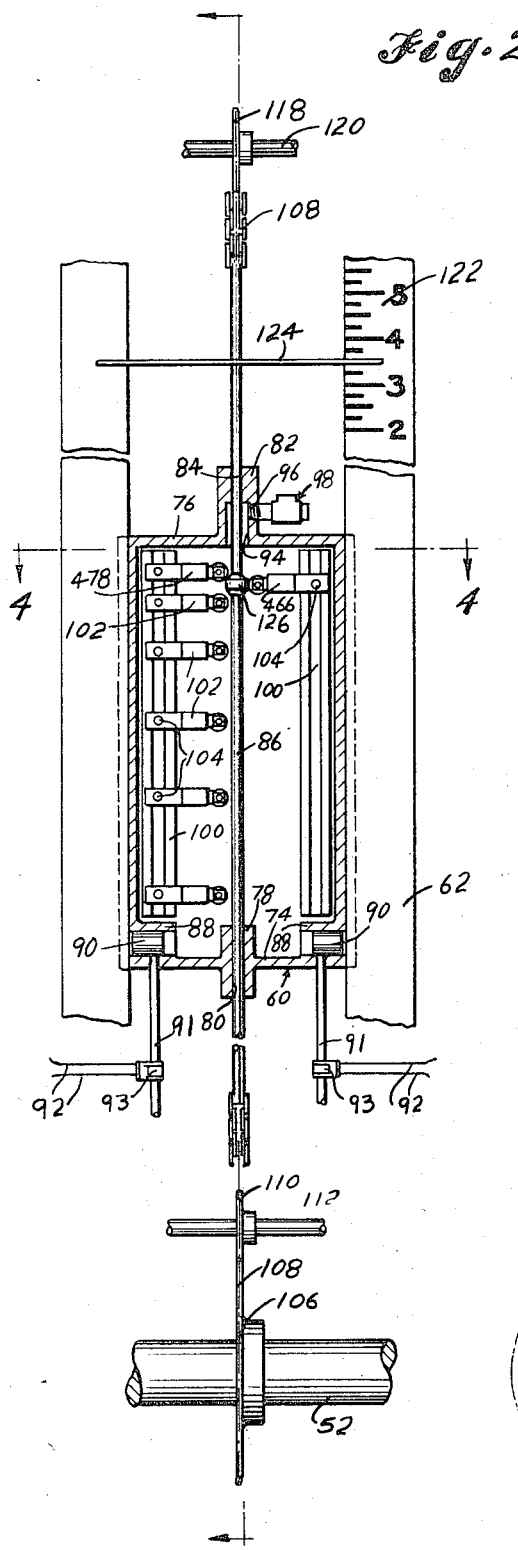
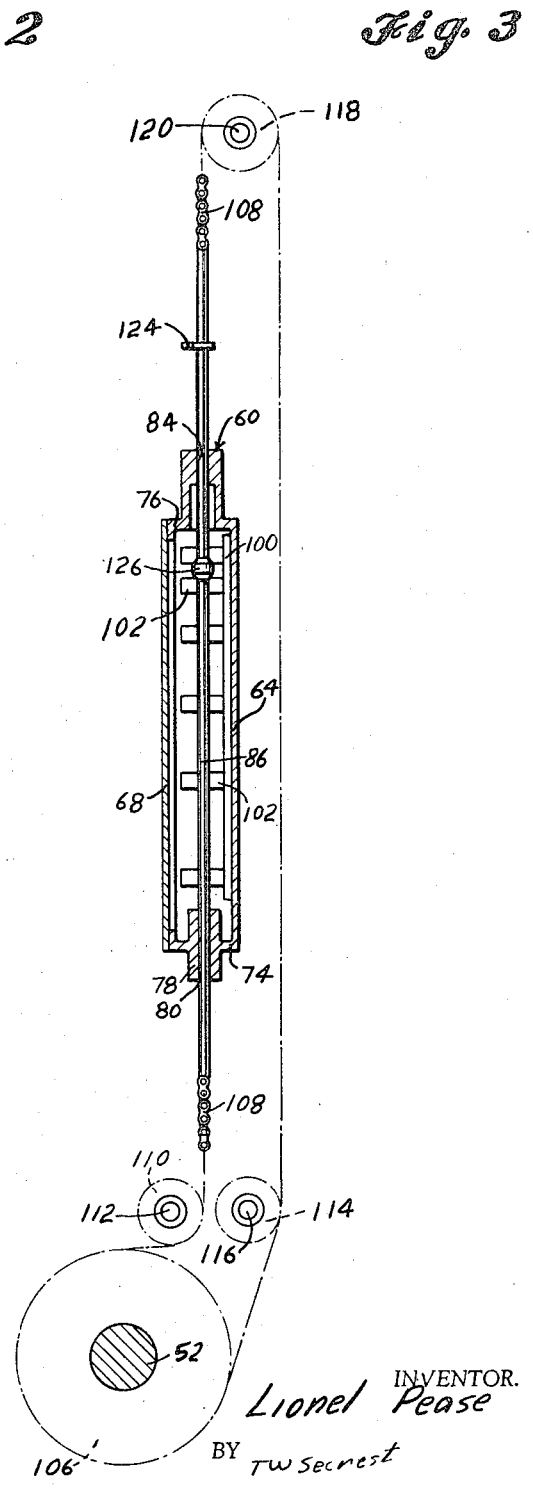
INVENTOR.
Lionel Pease
BY TW Secrest Sept. 17, 1968 L. PEASE 3,401,725

REMOTE CONTROL PRE-SET SYSTEM

Filed March 22, 1965 11 Sheets-Sheet 3

INVENTOR.
Lionel Pease
BY TW Secrest

Sept. 17, 1968

L. PEASE 3,401,725

REMOTE CONTROL PRE-SET SYSTEM

Filed March 22, 1965

INVENTOR.
Lionel Pease
BY TW Secrest

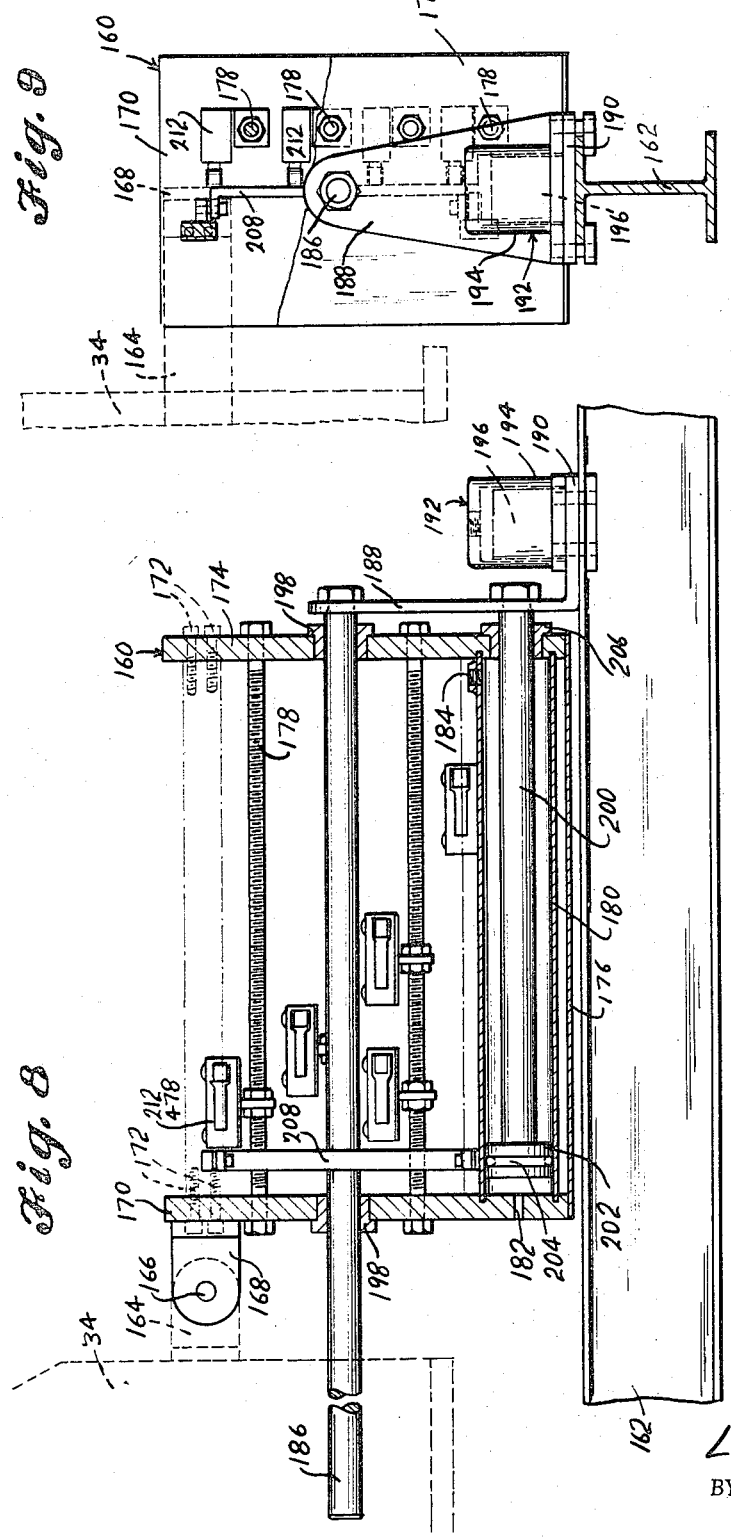

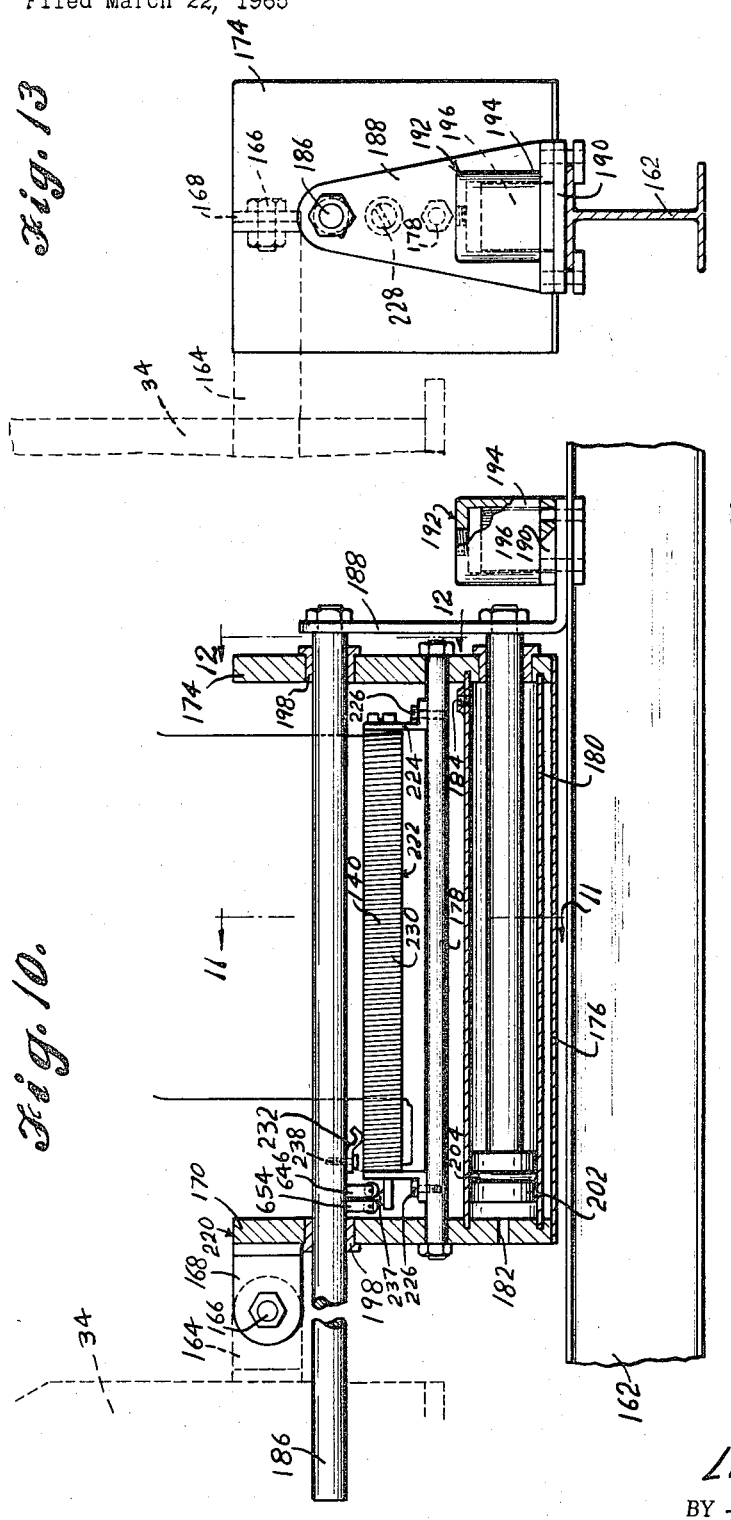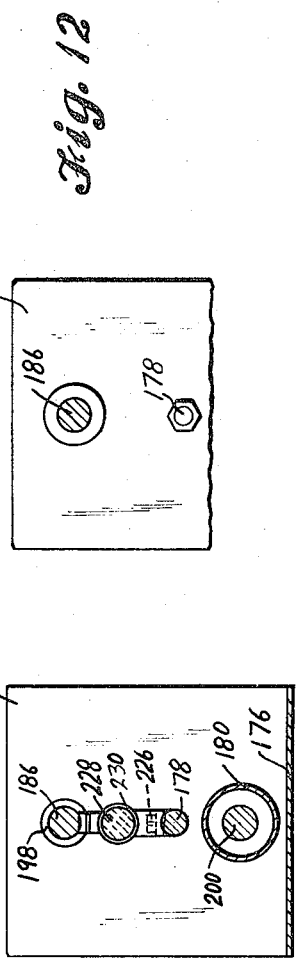

Sept. 17, 1968 L. PEASE 3,401,725
REMOTE CONTROL PRE-SET SYSTEM
Filed March 22, 1965 11 Sheets-Sheet 7
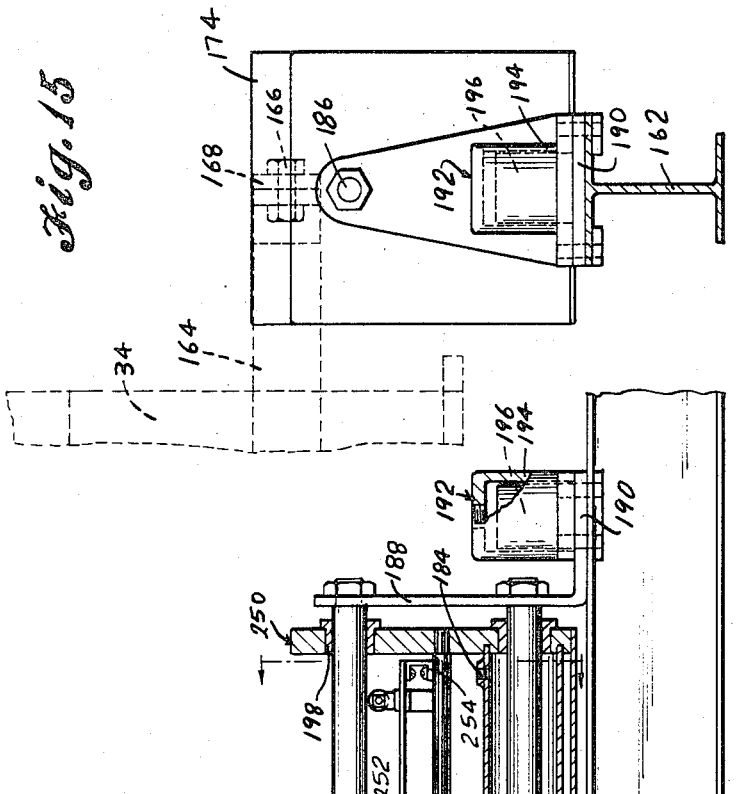
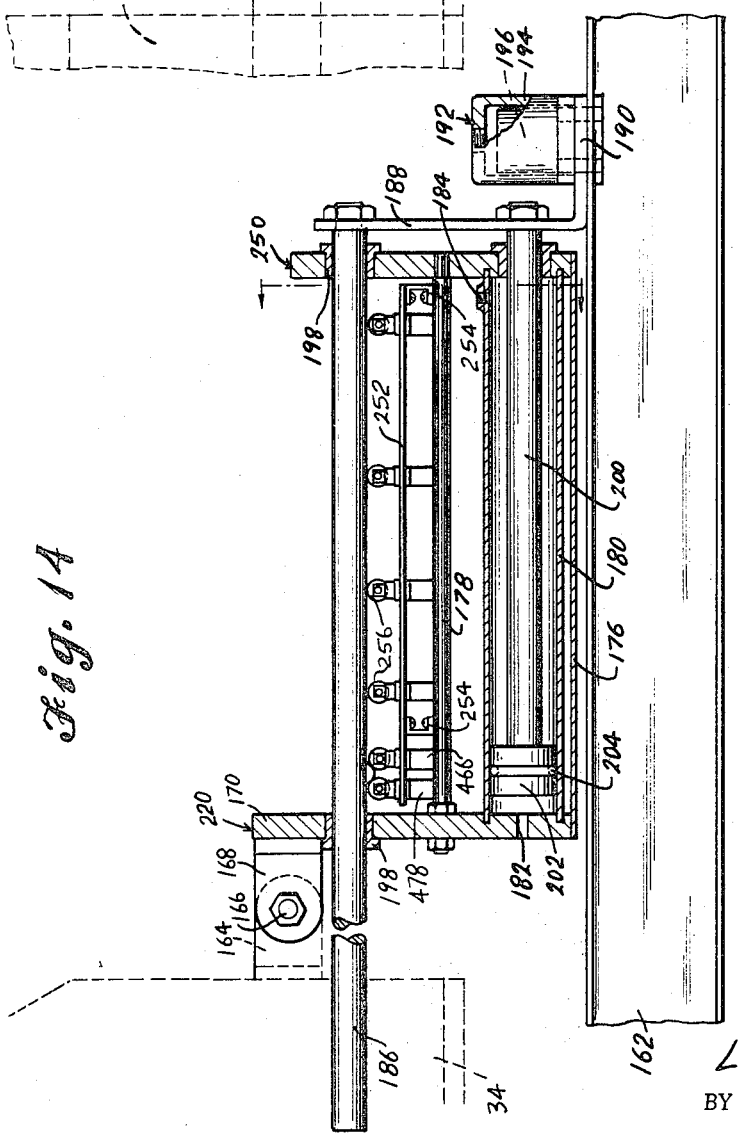
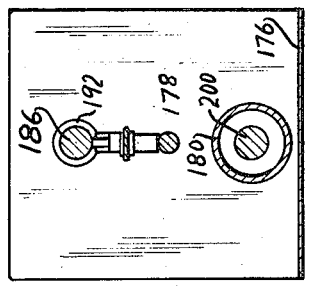
INVENTOR.
Lionel Pease
BY TW Secrest INVENTOR
Lionel Pease
BY
TW Secrest

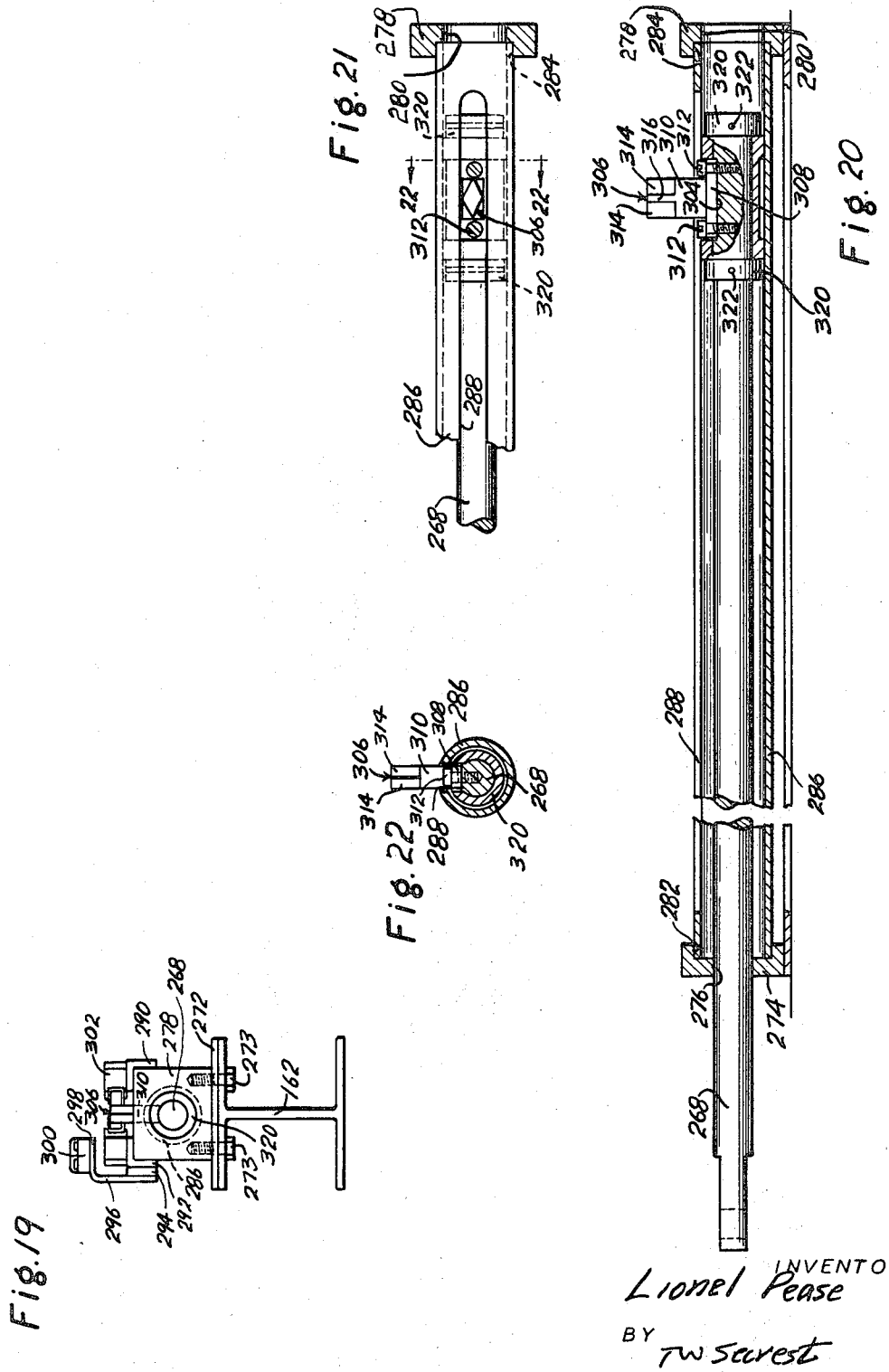

INVENTOR.
Lionel Pease
BY TW Secrest

United States Patent Office 3,401,725
Patented Sept. 17, 1968

3,401,725
REMOTE CONTROL PRE-SET SYSTEM
Lionel Pease, Seattle, Wash., assignor, by mesne assignments, to Lloyd Controls, Inc., Seattle, Wash., a corporation of Washington
Continuation-in-part of application Ser. No. 130,355, Aug. 9, 1961. This application Mar. 22, 1965, Ser. No. 444,504
27 Claims. (Cl. 143—115)

ABSTRACT OF THE DISCLOSURE

This invention is for a control unit for sawmill carriages to regulate the advancement of the knees and the log toward the saw line. The control unit makes it possible to advance the knees and the log, a predetermined distance, toward the saw line so as to allow the saw to remove a slab of wood or a flitch from the log. Then, the knees and the log can be further advanced so as to repeat this process. After the log has been sawed, it is possible to retract the knees so as to receive another log.

---

This application is a continuation-in-part application of the parent application, Ser. No. 130,355, filed Aug. 9, 1961, now abandoned.

This invention is a control apparatus for the movement of a mechanical apparatus and which movement may be limited to a predetermined distance.

In mechanical apparatus, the apparatus is often moved a predetermined distance. Also, it is desirable to move the apparatus various predetermined distances with successive movements. This particular invention is for the control of the movement of the mechanical apparatus and which movements may be predetermined distances and may be varied. A specific embodiment of this invention is in the control of the knees on a sawmill carriage. As is well known, the knees on a carriage hold a log. The log is passed by a saw which slices off so much of the wood. By moving the knees a certain distance, the log is moved forward toward the saw line and a piece of wood of a certain thickness is cut off the log. This invention is adapted to control the movement of the knees toward the saw line so as to thereby control the thickness of the slice of wood. Actually, the movement of the knees toward the saw line is for a predetermined distance and is, normally, under the control of the sawyer.

One of the objects and advantages of this invention is a provision of a control apparatus having an easily understood design and relatively few working parts so as to lessen the possibility of a breakdown of the control apparatus.

A further object is to provide a control apparatus which does not operate off a set shaft of a sawmill carriage but which control apparatus is controlled by the movement of the knee of the sawmill carriage.

A still further object is a provision of a control apparatus which is controlled by a rectilinear movement and not by a rotary movement.

Another object is to provide a control apparatus which in itself moves in a rectilinear path.

A still further object is the provision of a control apparatus having safety means in its circuit and which safety means limit the movement of the mechanical apparatus beyond a safe position.

Another object is to provide a control apparatus which is readily accessible for repairs in case one of the components malfunctions.

A still further object is the provision of a control apparatus which is relatively inexpensive to manufacture.

These and other objects and advantages will be more particularly brought forth upon reference to the accompanying drawings, detailed specification and the appended claims.

In the drawings:
FIGURE 1 is a plan view of a sawmill carriage, setworks and the control box therefor, and illustrates a log on the sawmill carriage;
FIGURE 2 is a front longitudinal vertical cross-sectional view of a particular embodiment of a control box for a sawmill carriage and which control box functions in response to a rectilinear movement and illustrates the same as connecting through a chain with a setshaft;
FIGURE 3 is a side longitudinal vertical cross-sectional view of the control box in FIGURE 2;
FIGURE 4, taken on line 4—4 of FIGURE 2, is a lateral cross-sectional view and illustrates the control box and the arrangement of the microswitches and the switch activator therein;
FIGURE 5 is a front longitudinal vertical cross-sectional view of another control box and shows a potentiometer therein and which potentiometer is wiped by a wiper that functions in response to a rectilinear movement and is under the control of the setshaft;
FIGURE 6 is a side longitudinal vertical cross-sectional view of the control box of FIGURE 5 and illustrates the wiper in contact with the potentiometer;
FIGURE 7, taken on line 7—7 of FIGURE 5, is a lateral cross-sectional view looking down on the potentiometer and the wiper passing across the potentiometer;
FIGURE 8 is a fragmentary vertical cross-sectional view illustrating another embodiment of the invention and which embodiment comprises numerous microswitches that are activated upon passing across a vertical member and which embodiment moves in response to the movement of the knee on the sawmill carriage;
FIGURE 9 is a vertical view looking at the end of the control of FIGURE 8 and shows the arrangement of the rods for carrying the microswitches;
FIGURE 10 is a vertical longitudinal cross-sectional view of another embodiment of the invention and which embodiment comprises a potentiometer and a wiper, and said potentiometer and wiper moving in response to the movement of the knee on the sawmill carriage;
FIGURE 11, taken on line 11—11 of FIGURE 10, is a vertical lateral cross-sectional view of the invention and illustrates the arrangement of the potentiometer and the wiper;
FIGURE 12, taken on line 12—12 of FIGURE 10, is a vertical lateral cross-sectional view of the control and illustrates the arrangement of the rod for carrying the potentiometer and also the rod for carrying the wiper;
FIGURE 13 is an end elevational view of the control of FIGURE 10 and shows the arrangement of the control as joined to the knee on the sawmill carriage and also the rail for supporting the end of the control;
FIGURE 14 is a vertical longitudinal cross-sectional view of still another embodiment of the invention and shows a series of microswitches mounted on one rod and a switch actuator mounted on the other rod, and said embodiment being attached to the knee on the sawmill carriage;
FIGURE 15 is an end elevational view of the control of FIGURE 14 and illustrates the same as attached to the knee on the sawmill carriage and the rail for supporting the control;
FIGURE 16, taken on line 16—16 of FIGURE 14, is a vertical lateral cross-sectional view and illustrates a series of microswitches and the switch actuator means for these microswitches;
FIGURE 17 is a plan view of another embodiment of the invention and which control is tied to the knee of the sawmill carriage;

FIGURE 19 is an end view of the invention of FIGURES 17 and 18;

FIGURE 20 is a fragmentary vertical longitudinal cross-sectional view of the housing and rod of the invention;

FIGURE 21 is a fragmentary plan view looking down on the housing and rod of the control unit;

FIGURE 22 is a lateral fragmentary vertical cross-sectional view looking at the housing, guide, and the actuator assembly of the control unit;

Figure 24:
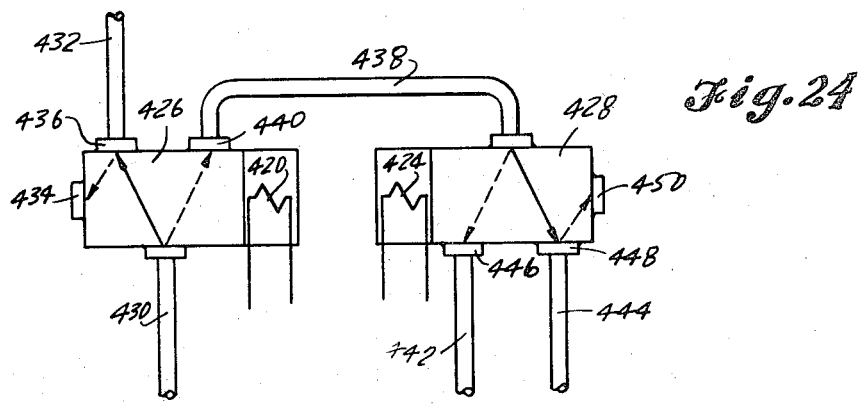
Figure 25:
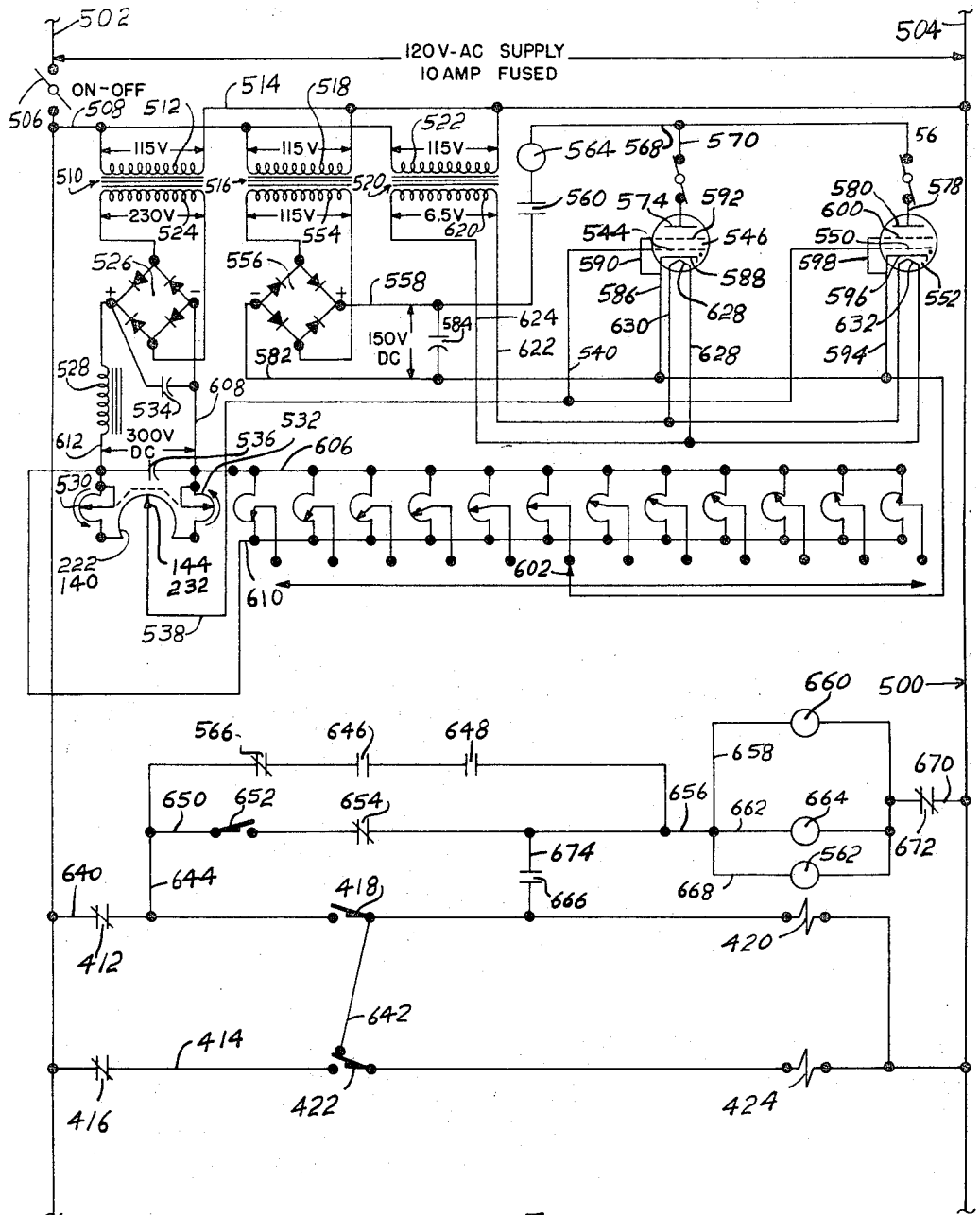

FIGURE 24 is a schematic diagram of an air pressure control system for controlling the movement of the valves and the flow of air to the air clutches of the gear box connecting with the setshaft of the sawmill carriage; and, FIGURE 25 is a schematic wiring diagram of the electrical system employing a potentiometer for controlling the operation of the driving means for the setshaft of the sawmill carriage.

Referring to the drawings, it is seen that the invention comprises a control unit 30 or a control unit 32 for the controlling of the movements of the knees 34 on the sawmill carriage 36. The carriage 36 carries a log 38. The log 38 is moved toward a saw line 40 by means of the knees 34. A saw 42 determines the saw line 42. The movement of the sawmill carriage 36 and the knees 34 is controlled by control panel 46 in the sawyer's box or cage 48. The control box 46 connects with the sawmill carriage 36 by means of a conduit 50.

Figure 1:
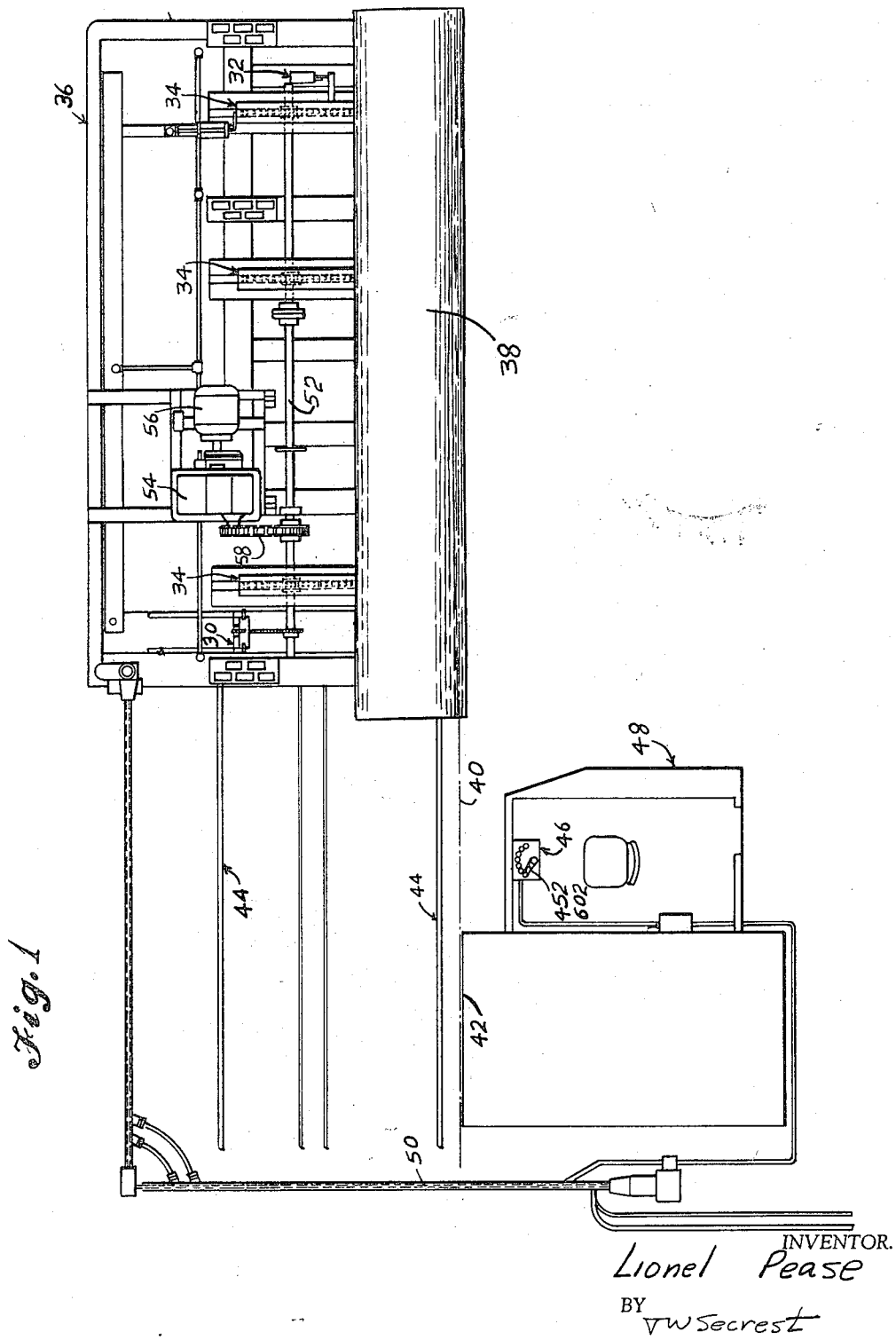

In FIGURE 1 there are illustrated two control units 30 and 32. It is seen that the control unit 30 is operated off the setshaft 52 on the sawmill carriage 36. The operation of the setshaft 52 is controlled by means of gear box 54 and motor 56. The control unit 30 controls the operation of the motor 56 and the gear box 54. The gear box 54 connects with the setshaft 52 by means of a chain 58.

Also, there is shown the control unit 32. The control unit 32 is not operated off the setshaft 52, but is operated off one of the knees 34. Again, the control unit 32 controls the operation of the motor 56 and the gear box 54. In normal practice there are not provided two control units on a sawmill carriage but only one control unit. In FIGURE 1, the two control units are schematically illustrated to show, in one drawing, the relative positions on the sawmill carriage 36.

Figure 4:
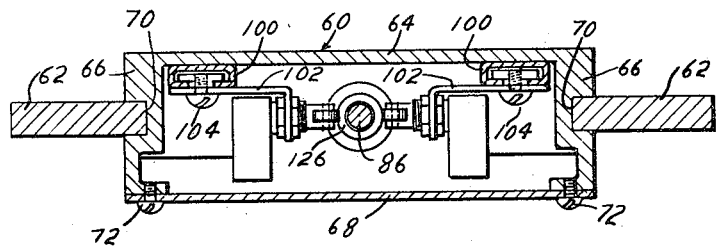

In FIGURES 2, 3 and 4, there is illustrated a control box which may be the control box in FIGURE 1. This control box is identified by reference numeral 60. The control unit comprises the two spaced-apart upright guides 62. These two guides may be of a flat bar stock and, as seen in FIGURE 4, in a lateral cross-sectional view are of a general rectangular configuration.

The control box 60 comprises what may be fabricated or a cast unit having a back 64, two sides 66 and a front plate 68. The sides 66 are notched or recessed as indicated at 70 so as to fit with the guides 62. The face plate 68 may be attached by means of screws 72. There is a bottom 74 and a top 76. In the bottom there is a sleeve 78 having a drilled passageway 80 therein. And, in the top there is a sleeve 82 having a drilled passageway 84 therein. In effect, the sleeves 78 and 82 act as guides for a rod 86 which runs through the box 60.

Near the bottom of the box and at each side is a chamber 88. The chamber 88 actually passes through the side walls 66. And in the chamber 88 is a plunger 90. The plunger 90 is pneumatically controlled. Pneumatic pipes or tubes 91 connect with the chamber 88. In these pipes or tubes are solenoid controlled valves 93. Lead-in wires 92 connect with these valves. The purpose of the plunger 90 will be more particularly brought forth in a later part of the specification.

The lower part of the sleeve 82 around the lower end of the passageway 84 is enlarged at 94. This leaves a clearance between the side wall of the sleeve 82 and the rod 86. A drilled tapped passageway 96 is in the side wall 82 and connects with the passageway 94. Positioned in this drilled tapped passageway 96 is a bleed-off valve 98. This valve allows fluid such as air or gas to pass slowly through it.

Attached to the inside of the back walls 64 are two guide brackets 100. Attached to these guide brackets are a number of microswitches. Each microswitch is attached to the guide 100 by means of a bracket 102. A bolt 104 attaches the bracket 102 to the guide 100. The particular microswitches and their function in the electrical circuit will be more particularly described in a later part of the specification.

The rod 86 is actuated by means of the setshaft 52. More particularly, on the setshaft 52 is a sprocket 106. A chain 108 connects the sprocket 106 with the rod 86. The lower end of the rod 86 connects with the chain 108 as previously stated. The lower end of the chain 108 runs around the sprocket 110. The sprocket 110 is on a shaft 112. As is seen in FIGURE 3, the lower end of the chain 108 runs around the back of the sprocket 110 and then around the front of the sprocket 106. Then the chain runs underneath the sprocket 106 and contacts the sprocket 114. The sprocket 114 is on the shaft 116. For practical purposes it can be considered that the sprockets 110 and 114 are idler sprockets or tension adjusting sprockets. Then the chain 108 extends upwardly and in back of the control unit 60 and over a sprocket 118. The sprocket 118 is on a shaft 120. The upper part of the chain 108 connects with the upper part of the rod 86.

Figure 7:
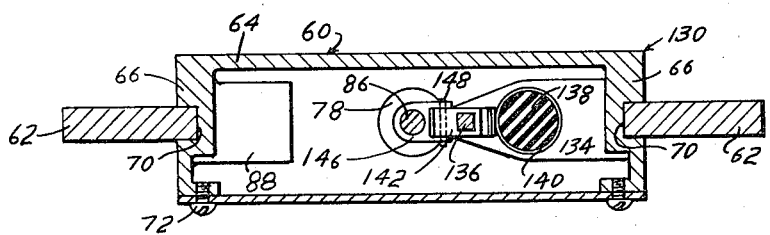
Figure 5:
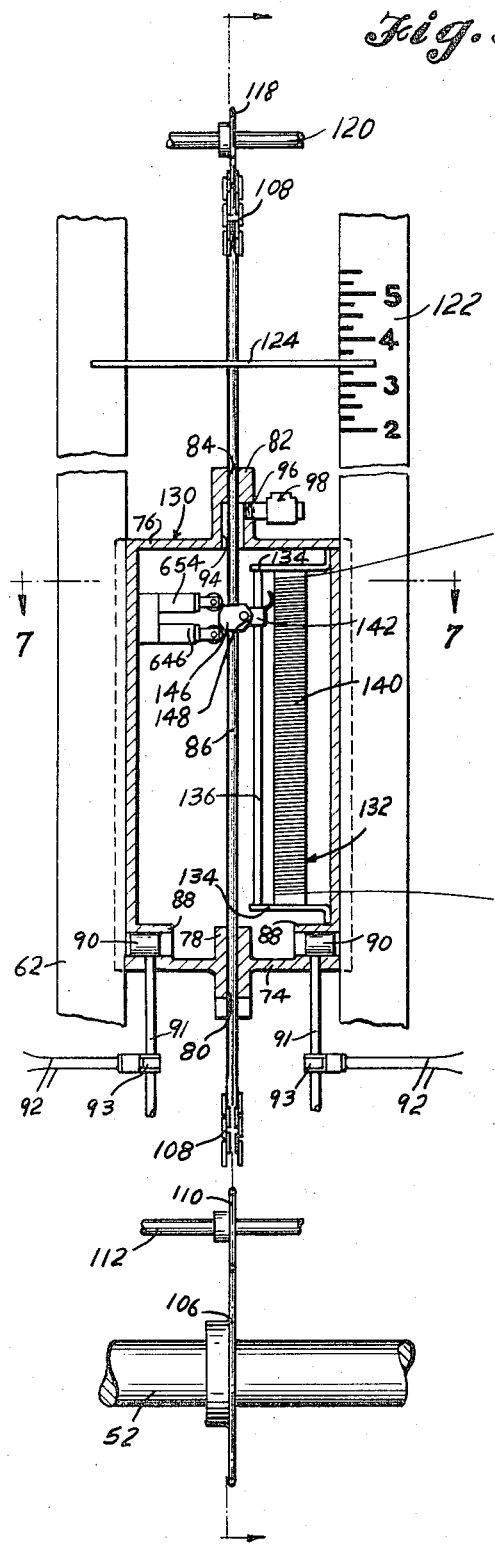
Figure 6:
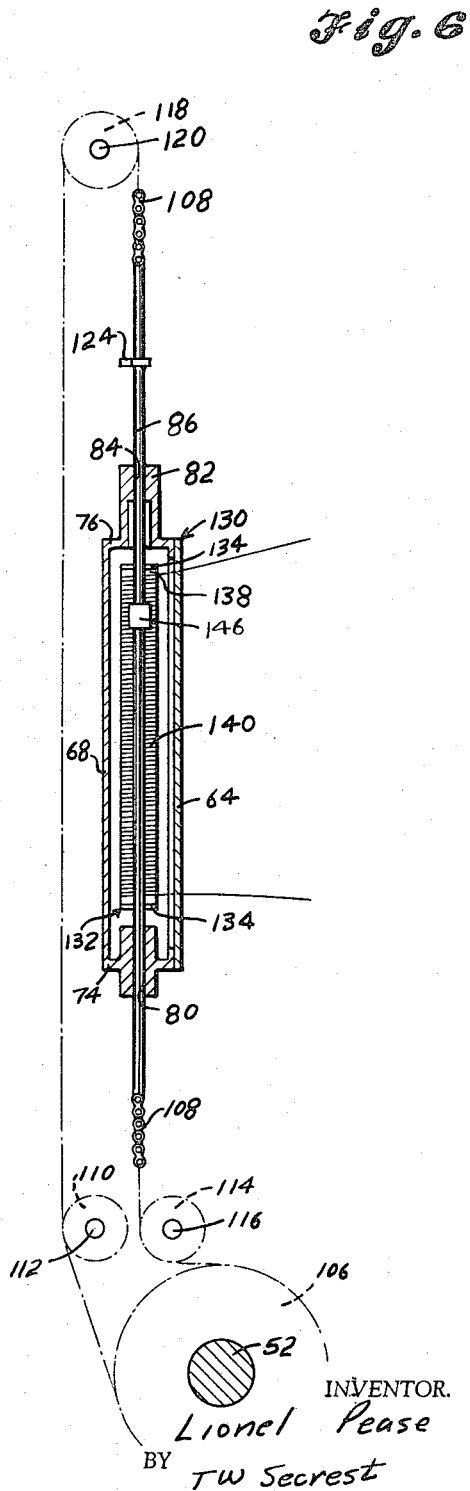

In FIGURES 5, 6 and 7, there is illustrated another control unit 130. This control unit has the same box as the control unit 60 in FIGURES 2, 3 and 4. In this control unit 130 there is mounted on one of the side walls 66 a potentiometer unit 132.

The potentiometer 132 comprises two spaced-apart brackets 134. The brackets 134 connect at their inner ends with the inner face of the wall 66. Also, the brackets are connected by a guide rod 136. Positioned between the two brackets 134 is a cylindrical tubular insulator 138. This insulator 138 may be of a ceramic material. Wrapped on the insulator 138 is a wire 140. The guide rod 136 carries a movable guide 142. On the inner end of this movable guide 142 is a wiper 144. A bracket 146 is attached to the vertically moving rod 86. It is seen that, as the vertically moving rod 86 moves downwardly, the bracket 146 also moves downwardly. A pin 148 connects together the bracket 146 and the guide 142.

It is seen that as the rod 86 moves vertically downwardly, the bracket 146 also moves downwardly. As a result the guide 142 and the finger 144 moves downwardly. The wiper 144 wipes across the coil 140. In this manner there is achieved a variable resistance for controlling the rotation of the setshaft 52. The electrical circuit, of which the potentiometer 132 is a part, will be more specifically described in a later part of the specification.

It is seen that in FIGURE 5 there are attached to the wall 66 two microswitches 646 and 654. These switches are in contact with the bracket 146. Their function and purpose will be more particularly brought forth in the description of the electrical circuit and the operation of the control unit.

In FIGURES 8 and 9 there is illustrated another control unit 160. This control unit is attached to the knee and is not operated off the setshaft. Positioned along one knee is a supporting rail 162. This supporting rail 162 may be an I-beam as illustrated in FIGURE 9. The control unit 160 is attached to the knee 34. On the back of the knee 34 there is attached a lug 164. The lug 164 is pinned at 166 to a lug 168. The lug 168 is attached to the front wall 170 of the control unit 160. It is seen that the lug 168 is attached to the wall 170 by means of bolts 172. Also, it is seen that the control unit 160 is free to rotate around the pin 166. Naturally, the degree of rotation of the unit 160 is a very small degree; but, nevertheless, there is a freedom of movement.

The control unit 160 comprises a first movable frame having a front wall 170, a rear wall 174, a bottom wall 176, and a number of tie-rods 178. Also, it is seen that a cylindrical tubular member 180 connects the front plate 170 with the rear plate 174. In the front plate 170 there is a passageway 182 connecting with the interior of the cylindrical tubular member 180. Also, near the back plate 174 there is a passageway 184 in the wall of the tubular member 180.

The control unit 160 also comprises a second movable frame. The second movable frame contains a guide rod 186. This guide rod 186 is attached to a bracket 188. The lower end of the bracket 188 bends into a foot 190. Attached to the upper part of the foot 190 is a solenoid operated brake 192. The brake 192 comprises a brake housing 194 and a plunger 196. It is seen that by activating the brake 192, the plunger 196 will bear against the upper part of the supporting guide rail 162 so that the guide 186 and the frame 188 are not free to move but are firmly positioned. It is seen that in the front wall 170 and in the rear wall 174, there are two passageways and in these passageways are guide bearings 198. The guides 198 position the guide rod 186 in the two walls.

Attached to the bracket 188 and projecting into the tubular cylinder 180 is a shaft 200. On the end of this shaft 200 is a piston 202 having an O-ring 204. Also, in the wall 174 there is a pressure seal or bearing 206. The pressure bearing 206 acts as a guide for the shaft 200 and, also, acts to seal the shaft 200 so as to prevent the escape of gas or air.

It is seen that on the guide shaft 186 there is an upright activator finger or plate 208. This plate is attached to tubular housing 180. The function of the finger 208 is to contact the microswitches 212.

The microswitches 212 are mounted on the rods 128. It is seen that on these rods 178 there may be mounted a number of microswitches for a number of settings as needed by the sawyer.

In operation, a certain microswitch 212 can be selected for closing the circuit. Then the brake 192 can be activated so as to firmly position the bracket 188, the guide rod 186 and the activating finger 208. With the moving of the knee, the walls 170 and 174, the tie rods 178 and the microswitches 212 are moved forward until a certain predetermined microswitch contacts the feeling finger 208. At this time the circuit is opened and the knee stops its forward movement. In order to set the control unit for the next forward movement, the brake 192 is released to that the guide rod 186 and the feeling finger 208 are free to move forward. The forward movement is accomplished by means of air pressure. A pneumatic hose leads into the tubular chamber 180. The plunger is operated from the pneumatic system for the sawmill carriage. With a release of the brake, the air pressure moves the plunger rod 200 and, therefore, the guide rod 186 forward. The air pressure may vary from time to time or from system to system but an operating air pressure may be 15 pounds per square inch or more as required. Any reasonable air pressure is normally satisfactory.

It is seen that the walls 170 and 174 and the associated parts are supported on the front end by means of the knee, the lugs 164 and 168 and the pin 166. The walls 170 and 174 and associated parts on the rear end are supported by the bracket 188, the guide rod 186 and the brake 192. By means of this, it is possible for the walls 170 and 174 and associated parts to be free to move with a relatively small degree of friction. Likewise, it is possible for the brake 192 and the guide rod 196 to be free to move with a relatively small degree of friction.

In FIGURES 10, 11, 12 and 13 there is illustrated another control unit 220. This control unit 220 is similar to the one in FIGURES 8 and 9 except, instead of using microswitches, there is used a potentiometer. This control unit is operated from the knee as is the control unit 160.

On the tie-rod 178 there is positioned potentiometer 222. This potentiometer 222 comprises two mounting brackets 224 which are attached to the tie-rod 178 by means of bolts 226. Positioned between the guide brackets 224 is a mounting base 228. The mounting base 228 may be of porcelain or ceramic. Wound on the insulator mounting base 228 is a wire 230.

Attached to the guide 186 is a wiper 232. This wiper is suitably insulated from the guide 186 by means of an insulator base 234 and a cover 236. The wiper is attached to the guide 186 by means of a bolt 238.

In operation the brake 192 is locked in position so that the guide rod 186 and the wiper 232 are not free to move or are firmly positioned. With the forward movement of the knee 34, the potentiometer 222 is wiped across the wiper 232 until a predetermined setting has been reached. At this said time, the setshaft stops moving and the knee stops moving forward. Then, with the release of the brake 192, the air pressure and the tubular cylinder 180 moves the brake 192, the guide rod 186 and the potentiometer forward to a so-called zero or initial position.

In FIGURES 14, 15 and 16, there is illustrated another modification of a control unit. This control unit is operated off the knee 34 and comprises a number of microswitches. More particularly, this control unit is identified by reference numeral 250. In the main principles of construction, it is similar to the control units of FIGURES 8, 9, 10, 11, 12 and 13.

On the tie-rod 178 there is positioned the microswitches 256. The function of these microswitches has been previously explained with respect to FIGURES 2 and 3. These microswitches are carried by a mounting rod 252. This mounting rod 252 connects with the tie-rod 186 by means of brackets 254.

The guide rod, near the knee, carries a cam or actuator 257 for actuating the microswitches.

As previously stated in regard to the control units of FIGURES 8 through 13, it is realized that, in order to control the forward movement of the knee 34, the brake 192 is actuated. This locks one part of the carriage, namely, the guide rod 186 and microswitches 254 with respect to the supporting guide rail 162. With the forward movement of the knee, the microswitches are moved forward until a predetermined microswitch contacts the cam or actuator 257. Upon the contacting of the preselected microswitch, the circuit is opened so that the setshaft no longer rotates, As a result the knee stops moving forward. Also, the brake 192 is released and the air pressure forces the plunger 200, the guide rod 186 and the brake forward to a predetermined or zero position. In this manner the control unit 250 operates. The electrical system for the control unit 250 will be more particularly brought forth in a later part of the specification.

In FIGURES 17, 18, 19, 20, 21 and 22 there is illustrated another control unit 260. This control unit is attached to the knee and is not operated off the setshaft. Positioned along one knee is a supporting rail 162. This supporting rail 162 may be an I-beam as illustrated in FIGURE 19. The control unit 260 is attached to the knee 34. On the back of the knee 34 there is attached a clevis member 264. The clevis member 264 has two spaced-apart legs 266 having passageways 267. The control unit 260 has a rod 268. The clevis member 264 is pinned by pin 270 to the rod 268. The rod 268 and the clevis member 264 are free to rotate with respect to each other.

The control unit 260 comprises a fixed base member 272 which may be welded to the rail 162 or attached by means of bolts 273. On one end of the base member 272 there is positioned an end plate 274 having a passageway 276 therein. On the other end of the base member 272 there is an end plate 278 having a passageway 280 therein. The end plate 274 is recessed at 282, and the end plate 278 is recessed at 284. In FIGURE 20 it is seen that the two end plates 274 and 278 are spaced apart from each other and that the recessed portions face each other. Positioned in these recessed portions is a long tubular member 286. The tubular member 286 has a longitudinal slot 288.

Figure 17:
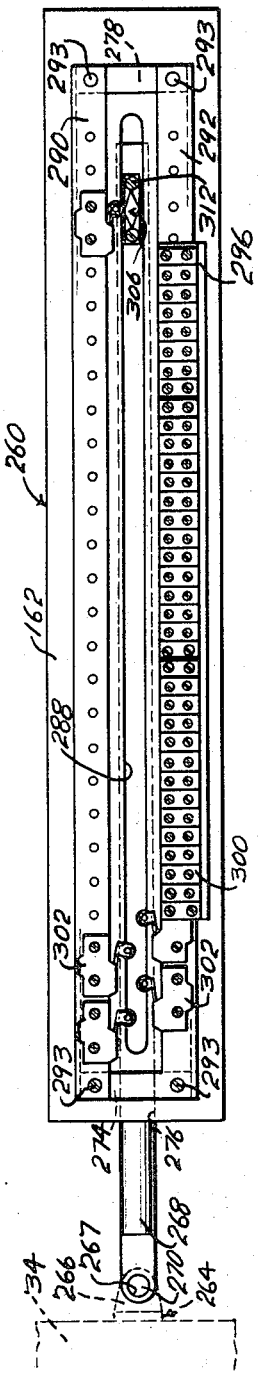
Figure 18:
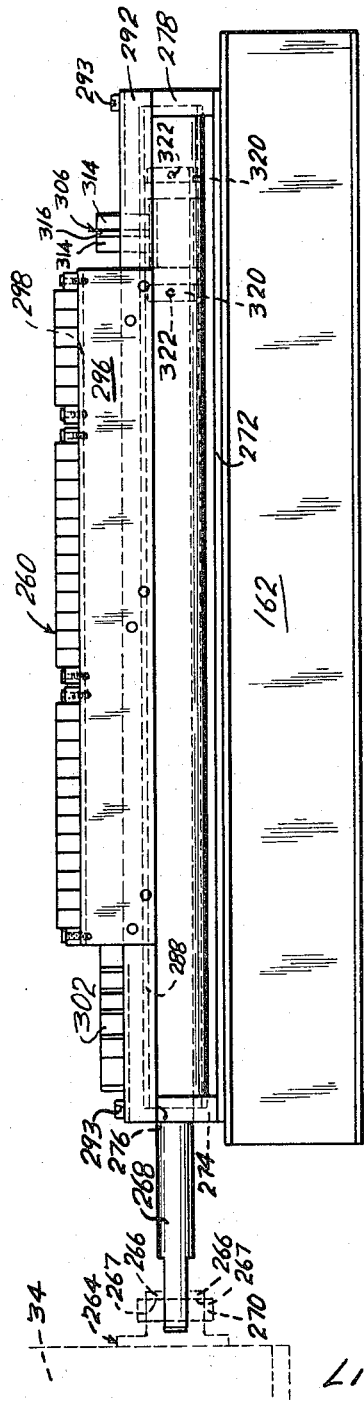
FIGURE 18 is a side elevational view of the invention of FIGURE 17.

In FIGURES 17, 18 and 19 it is seen that, on the upper and outer surfaces of each of the end plates 274 and 278, there are positioned angle iron supports 290 and 292 by bolts 293. These two angle iron supports 290 and 292 run between the two end plates 274 and 278 and may be tack welded to the end plates. On the outer surface of the angle iron 292 there is a spacer 294. A terminal support having an upright leg 296 and a horizontal leg 298 is attached to the spacer 294. The angle iron 292, the spacer 294 and the terminal support 296 may be welded together. On the upper leg 298 there is positioned a number of terminal blocks 300. Also, in these figures, it is seen that there are positioned on the angle irons 290 and 292 a number of microswitches 302. As is readily appreciated, lead wires connect with the terminal blocks 300 and, also, with the microswitches 302. These lead wires are not illustrated in order to have clarity of the drawings.

In the housing 288 there is positioned a rod 268. The end portion of the rod 268 is always in the housing 288. It is seen that the rod 268 is recessed at 304. Positioned on the recessed portion of the rod 268 is an actuator assembly 306. This assembly 306 has a long base portion 308 and an upright actuator portion 310. The base portion 308 is attached to the rod 268 in the recessed portion 304 by means of screws or bolts 312.

In FIGURES 20, 21 and 22 it is seen that the upper portion of the actuator 310 has four flat surfaces 314. The upper sides of the actuator 310 are flat as illustrated by the reference numeral 316. The surface 314 contacts the surface 316 at approximately a 45° angle or an interior angle of approximately 45°. The surfaces 314 which intersect each other on the end of the actuator 310 define an interior angle of approximately 90°. In FIGURES 20 and 22 it is seen that the actuator 310 projects out of the interior of the housing, through the slot 288 and above the housing 286. The reason for the actuator 310 projecting above the housing 286 is readily apparent from FIGURE 19 wherein it is seen that the actuator 310 contacts the microswitch 302. The surface 314 contacts the microswitch 302 so as to actuate the same. In this regard, the angle of the surface 314, being at approximately a 45° angle with the surface 316, decreases the wear on both the actuator 310 and on the microswitch 302.

In FIGURES 20 and 22 it is seen that on the rod 268 there are two collars 320. One of these collars 320 is on each side of the actuator assembly 306. The collars 320 may be pinned at 322 to the rod 268. The purpose of the collars 320 is apparent: so as to space or position the rod 268 in the housing 286. The collars 320 may be of many materials of construction. One of the materials of construction that I have used is tetrafluoropolyethylene, commonly known as Teflon.

In the particular embodiment of the control unit 260, it is not necessary to have a brake system as the base 272 is united with the rail 162. Thereby, the microswitches 302 are similarly united with the rail 162, which is firmly positioned on the carriage. With the forward movement of the knee 34, the actuator assembly 306 is moved forward until it contacts a predetermined microswitch 302. Upon the contacting of the preselected microswitch 302, the circuit is opened so that the setshaft no longer rotates. As a result, the knee 34 stops moving forward. In this manner the control unit 260 functions. The electrical system for the control unit 260 will be more particularly brought forth in a later part of the specification.

Figure 23:
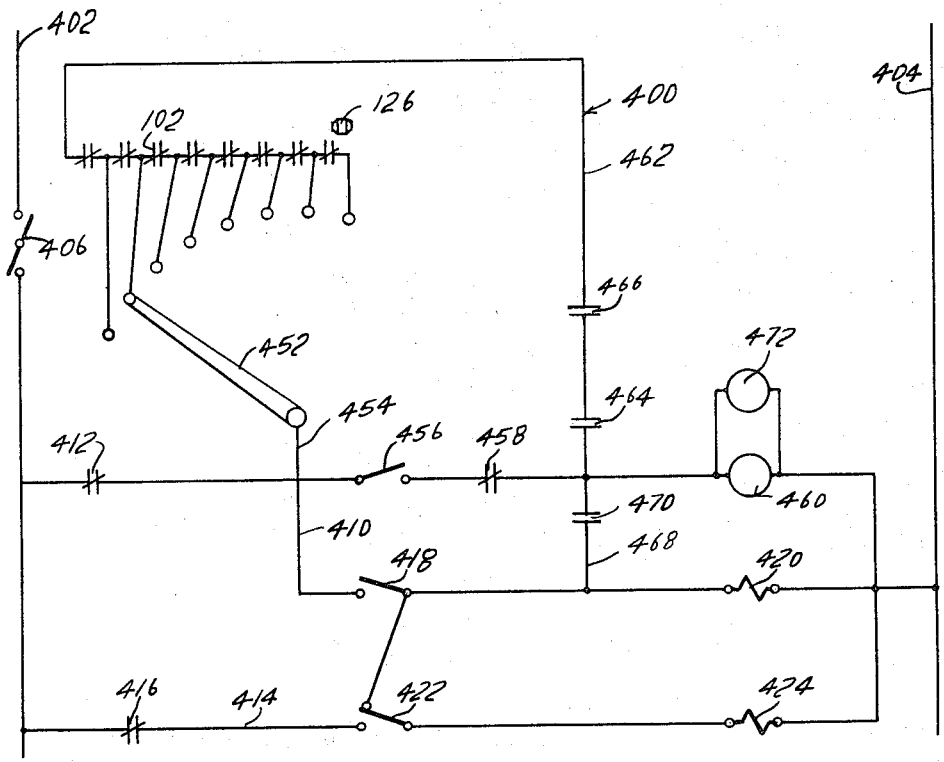
FIGURE 23 is a schematic wiring diagram of the control comprising microswitches and a switch actuator means therefor, and which switches control a driving means for driving the setshaft of the sawmill carriage.

In FIGURE 23 there is illustrated an electrical wiring diagram 400 and which wiring diagram can be used in conjunction with the control unit 60 of FIGURES 2, 3 and 4; control unit 160 of FIGURES 8 and 9; control unit 250 of FIGURES 14, 15 and 16; and, control unit 260 of FIGURES 17, 18, 19, 20, 21 and 22. The wiring circuit 400 comprises mains 402 and 404. In the line 402 there is a main switch 406. Connecting with line 402, is main 408. Main 408 branches into another line 410. In the line 408 there is forward limit switch 412. This forward limit switch is a safety switch and limits the forward movement of the knee. When the knee contacts the switch 412, the circuit is opened so that the setshaft can no longer rotate with the result that the movement is arrested.

A line 414 connects with the main line 402. In the line 414 there is a reverse limit switch 416. This reverse limit switch 416 is a safety switch; and, when the knee travels too far backward, the switch is opened so that the circuit is opened with the result that the reverse movement of the knee is arrested. As a result there is no power to the circuit, and the setshaft no longer rotates. In the line 410 there is a forward switch 418. This forward switch 418 is normally open. Between the forward switch 418 and the line 404, there is a solenoid 420. The solenoid 420 controls a valve which in turn operates an air clutch on the gear box.

In the line 414 there is a reverse switch 422. Between the reverse switch 422 and the line 404 there is the solenoid coil 424. The operation of the solenoid coil 424 controls an air valve which in turn controls the reverse air clutch of the gear box.

The gear box, controlled by the coils 420 and 424, is more particularly described in my copending patent application, Ser. No. 762,356, filing date of Sept. 22, 1958, entitled, "Power Take-off Unit," and which application issued into Patent Number 3,128,860 on Apr. 14, 1964.

The solenoids 420 and 424 controls the valves 426 and 428. It is seen that there is an air supply 430 leading into the valve 426. From the valve 426 there is an outlet 432 to the brake. Also, leading from the switching box 426 is an outlet 434. The outlet 434 is normally open. Connecting the switching box 426 with the outlet 432 is an outlet valve 436. The outlet valve 436 is normally open.

The solenoid air valve 428 is connected by piping 438. Connecting the solenoid air valve 426 with the piping or tubing 438 is a port 440. The air valve 428 has two outlets: 442 which leads to the forward clutch and 444 which leads to the reverse clutch in the power take-off unit of my Patent Number 3,128,860. The outlet 442 connects with valve 428 through a port 446. The outlet 444 connects with 428 through a port 448. Also, there is an exhaust port 450 from valve 428.

In operation the port 440 is normally closed and the port 436 is normally opened. As a result, the air supply goes to the brake through outlet 432. With the air supply going to the brake, the rotation of the output shaft of the gear box is restricted and the setshaft is not rotating.

To rotate the setshaft and to move the knees, the solenoid 420 is activated so that the port 436 is closed and the air in the air brake exhausts through the port 434 so that the brake is released and the port 440 is opened. The port 448 is normally open and the port 446 is normally closed. In this arrangement the air supply goes through 430, 426, 440, 438, 428, 448 and through 444 to the reverse clutch. In this manner the setshaft is set into reverse motion and the knee backs away from the saw line.

For forward actuation of the setshaft, both solenoids 420 and 424 are activated. As a result, the port 436 is closed, releasing the brake, and the port 440 is opened. Also, the port 448 is closed and the port 446 is opened. In this configuration the air supply passes through 430, 426, 440, 438, 428, 446, 442 and to the forward clutch The setshaft revolves forwardly and the knees advance toward the saw line.

For reverse motion of the setshaft under manual control, the switch 422 is closed so as to close the circuit between the line 402 and the line 404 through solenoid 424. As previously explained, the air supply goes to the reverse clutch and gear box so as to rotate the setshaft in the reverse direction.

For the forward movement of the setshaft, the forward switch 418 is closed so that the circuit between the line 402 and the line 404 is completed through 408, 410, and the solenoid 420 and, also, through the switch 422 and the solenoid 424. As was previously explained, in this configuration the air goes to the forward clutch in the gear box through outlet 442 and the setshaft rotates in a forward direction.

For automatic operation the contact arm 452 contacts an appropriate microswitch. This contact arm 452 connects with line 408 through line 454. The microswitches are normally closed. The contact arm selects a microswitch corresponding to a predetermined measurement. It is understood that the predetermined measurement is for the thickness of a slice of lumber and corresponds to the forward movement of the knee.

In the line 408 there is a switch 456. Also, in the line 408 there is a normally closed microswitch 458. In addition, in the line 408 there is a pre-set relay 460. The line 408 connects with the microswitches 102 by means of line 462. The line 462 connects with the line 408 between a switch 458 and a pre-set relay 460. As is seen in FIGURE 23, the microswitches 102 are in series and the line 462 connects with the end switch of the switches.

In the line 462 are contacts 464. The contacts 464 are under the control of the pre-set relay 460. In addition, in the line 462 are contacts 466. The contacts 464 and the contacts 466 are normally in an open position. Between the line 410 and the line 408 is a line 468. In the line 468 are contacts 470. The contacts 470 are under the control of the pre-set relay 460. The line 468 connects with the line 408 between the normally closed contacts 458 and the pre-set relay 460. Line 468 connects with line 410 between the forward switch 418 and the solenoid coils 420.

Also, there is a coil 472. This coil 472 controls the operation of the plungers 90, see FIGURES 2 and 5. Also, the coil 472 controls the operation of the brake 192, see FIGURES 8, 9, 10, 13, 14 and 15. It is to be realized that the coil 472 controls the various braking means for the appropriate controls.

In operation, the arm 452 is thrown into contact with the appropriate microswitch 102 or 302 in the control box 46 or the control unit 260. This is a predetermined microswitch and is selected depending upon the desired movement of the knee. Then, the switch 456 is closed. With the closing of the switch 456, the pre-set relay coil 460 is activated so as to close the normally opened contacts 464. As previously stated, the contacts 458 are normally open but are held closed by means of the actuator 126 or 306, see FIGURES 2 and 14; bar 208 in FIGURE 8; and, actuator 306 in FIGURE 18. These are substantially the equivalent.

The contacts 466 are normally closed, but are held open.

With the closing of the switch 456 the pre-set relay 460 also closes the normally opened contacts 470 so that current passes through the solenoid coils 420 and 424. It is to be remembered that the forward switch 418 connects with the reverse switch 422. In addition, the solenoid coil 472 is activated so as to release the braking mechanism 90 or the braking mechanism 192 or other appropriate braking mechanisms. As a result, the setshaft rotates forwardly and the microswitch activator 126 or 306 moves, or the microswitches move past the bar 208 depending upon the control employed. With the movement of the switch activator 126 or the microswitches past the bar 208, the normally opened contacts 458 open and current is no longer passing through the contacts 458. However, current is passing from line 402 to 404 through switch 406, line 408, forward limit switch 412, line 454, arm 452, appropriate microswitches 102, line 462, closed contact 466, closed contacts 464, and solenoid coil 460 and also coil 472, closed contacts 470, line 468, solenoid 420, switch 418, switch 422, and solenoid 424. As a result the coils 420 and 424 are energized so that the forward clutch in the gear is activated to rotate the said shaft in a forward direction. However, with the switch actuator 126 or switch actuator 208 or switch actuator 306 contacting the appropriate microswitch, the circuit is opened and electrical energy no longer flows through the coils 420 and 424. As is realized the forward clutch is deactivated, and the brake in the gear box is actuated, and the setshaft ceases to rotate. For the next cut of lumber or for the next forward movement of the knees, the arm 452 may be moved to another microswitch contact or may be left on the same microswitch contact. In the above presentation with the stopping of the electrical energy flowing through the coil 472, the brake 90 or the brake 192 is actuated.

In FIGURE 25 there is presented an electrical circuit 500 for use with the control unit 130 of FIGURES 5, 6 and 7, the control unit 260 of FIGURES 10, 11, 12 and 13. This circuit comprises potentiometers for controlling the firing of thyratron tubes. Upon the firing of a thyratron tube, the circuit is opened and the brake of the gear box is activated so as to arrest the rotation of the setshaft.

The manual control features of the circuit are the same as the manual control features of the circuit of FIGURE 23; and, therefore, the same reference numerals are used in this circuit as in the circuit of FIGURE 23. Because of this the manual control will not be described in detail.

The circuit 500 comprises main lines 502 and 504. The potential across these two lines is approximately 120 v. AC. In the line 502 is the main switch 506. A line 508 connects with the main line 502. Transformer 510 having a primary 512 connects with the line 508. The primary connects with line 514. In turn, the line 514 connects with line 504. A transformer 516 having a primary 518 connects with line 508 and also with line 514. A transformer 520 having a primary 522 connects with line 508 and also with line 514.

A transformer 510 has a secondary 524. This secondary 524 connects with the input to a bridge rectifier 526. The output of the bridge rectifier 526 connects with the main potentiometer 140. This main potentiometer coil is more fully illustrated in FIGURE 5 and also in FIGURE 10. The positive side of the rectifier circuit 526 connects with the potentiometer 140 through a choke 528 and a trimmer potentiometer 530. The negative side of the rectifier 526 connects with the main coil 140 through a trimmer potentiometer 532. Also, the positive or negative sides of the rectifier 526 are connected by means of a capacitor 534. In addition, the two trimmer coils 530 and 532 are connected together through a capacitor 536. The function of the trimmer condensers 530 and 532 is to take into account variations in the coils and which in turn varies the settings.

The main potentiometer 140 is wiped by wiper 144 or 232, see FIGURES 5 and 10 respectively. The wipers at 144 or 232 connect with the line 538. The line 538 connects with the line 540. The line 540 connects with a grid 544 in a first thyratron tube 546. Also, the line 538 connects with a grid 550 in a second thyratron tube 552.

The transformer 516, used for supplying current to the cathodes of the thyratron tubes, comprises a secondary 554. The secondary 554 connects with a bridge rectifier 556. The secondary 554 is approximately 115 volts.

The positive side of the rectifier 556 connects with the line 558. In this line 558 there are relay contacts 560 (see FIGURE 23). The relay contacts 560 are under the control of relays 562. Also, in the line 558 is set relay coil 564. Set relay coil 564 controls relay contacts 566.

The set relay coil 564 connects with line 568. The line 568 connects with line 570. In the line 570 there is a switch 572. The line 570 connects with the positive plate 574 of the first thyratron 546 by means of line 571. The line 568 also connects with a switch 576. The switch connects by means of line 578 with the plate 530 in the second thyratron tube 552.

The negative side of the bridge rectifier 556 connects with a line 582. The lines 558 and 582 are connected by means of a capacitor 584. The line 582 connects by means of line 586 with cathode 588 in the first thyratron 546. The cathode 588 connects by means of line 590 with screen grid 592 in the first thyratron 546. It is to be understood that the cathode 588 and screen grid 592 are at substantially the same electrical potential. The line 582 also connects with a line 594. The line 594 connects with a cathode 596 in the second thyratron tube 552. The cathode 596 connects by means of line 598 with a grid 600 in the second cathode 552. It is to be understood that the cathode 596 and the screen grid 600 are at substantially the same potential.

The line 582 also connects by means of a wiper or a set switch 602 with at least one of a series of the potentiometers 604. It is to be understood that these potentiometers are in the switch box 46 at the sawyer's station 48. As is seen in FIGURE 25, there are a series of these potentiometers 604.

One side of these potentiometers 604 is connected to a line 606. The line 606 connects with line 608. The line 608 runs between the trimmer potentiometer 532 and the negative side of the rectifier bridge 526. Also, the other side of the potentiometer 604 connects with a line 610. The line 610 connects with line 612. The line 612 is between the choke 528 and the trimmer potentiometer 530.

It is to be understood that the sawyer at his control station can move the switch or wiper 602 so as to place it in contact with an appropriate predetermined potentiometer 604. By this means he can select and predetermine the forward movement of the knee on the sawmill carriage. This knee is underneath the control of the movement of the setshaft. However, it is to be remembered that the wiper 144 may be run directly from the setshaft on the sawmill carriage or may be in response to the linear movement of the knee on the sawmill carriage. The electrical circuit of FIGURE 25 can be operated either off a rotatory motion of the setshaft or a rectilinear motion of the knee.

The transformer 522, feeder supply for the cathode in the thyratron 546 and 552, comprises a secondary 620. This secondary, through leads 622 and 624, connects with the heater elements for the cathode in the two thyratron tubes. More particularly, heater element 626 in the first thyratron 546 connects by means of leads 628 and 630 with the two leads 622 and 624. Leads 622 and 624 connect directly with the heater element 632 in the second thyratron 552.

The electrical circuit 500 also comprises control coils and switches for controlling the clutches in the gear box. The input line 502 connects by means of line 640 with the forward limit switch 412. In line 640 is the manual forward switch 418. In addition, in line 640 is the forward solenoid coil 420.

The reverse limit switch 416 is in line 414. Also in line 414 is the manual control switch 422 and the reverse solenoid coil 424. The lie 640, after leaving the forward solenoid coil 420, connects with the line 414 and then joins line 504. The manual forward switch connects with the manual reverse switch by means of line 642.

Connecting with line 640, between the forward limit switch 412 and the manual forward switch 418, is line 644. This line 644 comprises normally closed switch contacts 566, normally closed switch contacts 646, and normally open switch contacts 648.

Line 644 connects with line 650. In line 650 is a pre-set switch 652. Also in line 650 are the re-set switches 654. The re-set switches 654 are normally open but held closed at the time the action is initiated.

Line 644 and line 650 unite and connect with line 656. Line 656 branches into lines 658, 662, and 668. In line 658 is a coil 660. The coil 660 controls the valves 93, i.e., brakes 90, brake 192 and brake 360.

The line 656 also connects with line 662. In the line 662 is a coil 664. The coil 664 controls normally open contacts 648 and normally open contact 666.

The line 656 connects with line 668. In the line 668 is the coil 562. The coil 562 controls contacts 560.

As is seen in FIGURE 25, the coils 660, 664 and 562 are in parallel. All these coils connect with the line 500 through line 670. In the line 670 are overload contacts 672.

The switch contact 666 are in the line 674. As is seen, the line 674 connects with the line 650 between switch contacts 654 and line 656. Line 674 connects with line 640 between the manual forward switch 418 and the forward solenoid coil 420.

As the manual features of this circuit are substantially the same as the circuit 400 of FIGURE 23, the operation of the manual features will not be repeated.

Turning now to the operation of the automatic features of this circuit, it is seen that the sawyer selects an appropriate potentiometer 604 and moves the switch to this appropriate potentiometer. For example, the sawyer may wish to advance the knee a distance of approximately 12 inches. By placing the wiper or switch 602 at the proper potentiometer, the knee will advance 12 inches.

It is understood that the main switch 506 is closed. Then the pre-set switch 652 is closed. Current flows through the line 650 and the closed switch contacts 654. The coils 660, 664 and 562 are actuated. With the actuation of the coil 660, the valves 93 are actuated so that the plungers 90 or brake 90 are activated so that the box 130 is held in a vertical position even though the rod 86 moves downwardly. Similarly, if the control unit 222 is being operated, the brake 192 is actuated so that the frame member 188 does not move even though the frame member 170 does move. Likewise, the brake 360 is actuated.

With the actuation of the coil 664, the switch contacts 648 and 666 are closed. As a result of the closing of the switch contact 666, the solenoid coils 420 and 424 are actuated so that the forward clutch in the gear box is closed so that the setshaft rotates to move the knee in a forward direction.

With the actuation of the solenoid cell 562, the switch contacts 560 are closed so that the output of the rectifier bridge 556 connects with the plate 574 in the first thyratron tube 546 or at the plate 580 in the second thyratron tube 552.

As is realized, at this time the setshaft is rotating in a forward direction and the knee is moving in a forward direction. As a result the wiper 144 or the wiper 232 is moving across the potentiometer coils 140. This is important as with the movement of the wiper 232 or the wiper 144, the switch contacts 654 are opened. These contacts are normally opened but are held closed until the knee moves forward or until the setshaft rotates.

With the opening of the switch contact 654, the apparatus is under complete automatic control. More particularly, the circuit is now from line 502, lead 640, forward limit switch 412, line 644, normally closed switch contacts 566, switch contacts 646, closed switch 648, leads 656, and through coils 660, 664 and 562, to the overload switch contact 672 and the line 670 to the other line 504. In order to have the flow of current through this line, the switch contacts 646 must be closed. The switch contacts 646 are wired to be normally closed but are held open by a lug or actuator 146 on, for example, the vertical rod 86 or the off-set actuator 237 on the front bracket 224. The offset actuator and microswitches allow the potentiometer to move by the microswitches. More particularly, until the knee begins to move or the setshaft to rotate, the switch contacts are held open. However, with the movement of the knee or the rotation of the set-shaft, the switch contacts 646 are allowed to close.

Now, with the control unit on automatic operation, the setshaft continues to rotate in a forward direction, and the wiper 144 is wiping over the potentiometer coil 140 or the wiper 232 is wiping over the coil 222. This forward movement of the knee or the rotation of the setshaft continues until the grid 544 is substantially at the same potential as the cathode 588 and the screen grid 592. When the positive potential of the grid 544 increases slightly above that of the grid 592, the thyratron fires. Likewise, when the positive potential of the grid 550 is substantially at the same potential as the cathode 596 and the screen grid 600, the tube will not fire. But, when the positive potential of the grid 550 increases slightly above the grid 600, the thyratron fires. More particularly, when the grid 550 reaches a slightly positive potential with respect to the grid 600 and the cathode 596, the thyratron fires. With the firing of the thyratron 546 or 552, the circuit is completed through the set relay coils 564. With the completion of the circuit through the set relay coils 564, the normally closed switch contacts 566 are opened and the circuit is open. As a result, the relay coils 660, 664 and 562 no longer receive electrical energy and are in an inactive state. As a result, the switch contacts 666 and 648 are opened. Further, the switch contact 560 is opened. As a further result, the solenoid coils 420 and 424 are deactivated and the brake mechanism of the gear box is activated so that the gear box is no longer in a condition to cause the setshaft to rotate and the knee to move in a forward direction.

The above procedure may be repeated for the forward movement of the knee until the knee contacts the forward limit switch 412 which opens the circuit. After the circuit is opened by means of the forward limit switch 412, it is not possible to rotate the setshaft in a forward direction as the brake mechanism in the gear box prevents the rotation of the setshaft.

Further, if the knee is moved in a rearward direction, it will move until it contacts the reverse limit switch 416. Upon contacting the reverse limit switch 416, the circuit is opened, and the setshaft is no longer activated to move the knee as the brake mechanism in the gear box is activated.

A safety feature is the overload limit switch 672. If by some manner too much electricity flows through the line 670, the overload limit switch 672 is activated so as to open the circuit and thereby activate the brake mechanism of the gear box and thereby prevent the rotation of the setshaft.

It is noted that there is employed two thyratron tubes 546 and 552. There are two main reasons for the use of two thyratron tubes. One of these is that, if one of the tubes fails to fire, there will not be a runaway of the circuit as the second thyratron tube will fire. The other reason is that the second thyratron tube can simultaneously take the place of the first thyratron tube upon the failure of the first thyratron tube. In FIGURE 25 the voltage across the mains is 120 v. AC. It is to be realized that this voltage may be other than 120 v. AC and varied by suitable electrical means to the desired voltages.

The actuator 126 is of a generally cylindrical configuration which tapers at approximately a 45° angle to the ends. The reason for the 45° angle is to minimize the wear on the microswitches. I consider that, if the angle were other than 45°, the wear would be greater.

Although this invention has been described with respect to moving the knee of the sawmill carriage toward the saw line, it is to be appreciated that the control unit can also be used for moving an object a certain distance. More particularly, it may be desirable to move an object a certain predetermined distance. This control unit can be used to so control the movement either by manual or by automatic means.

Having presented my invention, what I claim is:

1. A control unit, said control unit comprising:
 (a) a first mounting base and a second mounting base;
 (b) a first electrical control means mounted on one of said mounting bases and an actuator for said first electrical control means mounted on the other one of said mounting bases;
 (c) means to hold the first mounting base in a fixed position while the second mounting base moves;
 (d) a remote control base physically separated from said control unit; and,
 (e) said remote control base electrically connecting with said control unit to electrically operate said control unit.

2. A control unit, said control unit comprising:
 (a) a first mounting base and a second mounting base;
 (b) electrical circuit means mounted on one of said mounting bases and an actuator for said electrical circuit means mounted on the other one of said mounting bases;
 (c) means to hold the first mounting base in a fixed position while the second mounting base moves;
 (d) a remote control base physically separated from said control unit; and,
 (e) said remote control base electrically connecting with said control unit to electrically operate said control unit.

3. A combination of a sawmill carriage and a control unit, said sawmill carriage comprising:
 (a) knees;
 (b) a setshaft;
 (c) means by which the setshaft moves the knees;
 (d) said control unit controls the movement of the setshaft;
 (e) said control unit comprising a first mounting base and a second mounting base;
 (f) electrical circuit means mounted on one of said mounting bases and an actuator for said electrical circuit means mounted on the other one of said mounting bases;
 (g) means to hold the first mounting base in a fixed position while the second mounting base moves;
 (h) said control unit being on said sawmill carriage;
 (i) a remote control base physically separated from said control unit and from said sawmill carriage; and,
 (j) said remote control base electrically connecting with said control unit to electrically operate said control unit.

4. A control unit, said control unit comprising:
 (a) a first mounting base and a second mounting base;
 (b) said first and second mounting bases adapted to move substantially vertically;
 (c) electrical circuit means mounted on one of said mounting bases and an actuator for said electrical circuit means mounted on the other one of said mounting bases;
 (d) means to hold the first mounting base in a fixed position while the second mounting base moves;
 (e) means to allow the first mounting base to move substantially vertically downward to follow the movement of the second mounting base;
 (f) a remote control base physically separated from said control unit; and,
 (g) said remote control base electrically connecting with said control unit to electrically operate said control unit.

5. A combination of a sawmill carriage and a control unit, said sawmill carriage comprising:
 (a) knees;
 (b) a setshaft;
 (c) means by which the setshaft moves the knees;

(d) said control unit comprising a first mounting base and a second mounting base;
(e) said first and second mounting bases adapted to move substantially vertically;
(f) electrical circuit means mounted on one of said mounting bases and an actuator for said electrical circuit means mounted on the other one of said mounting bases;
(g) means to hold the first mounting base in a fixed position;
(h) means connecting the setshaft and the second mounting base whereby the base moves;
(i) means to allow the first mounting base to move substantially vertically downward to follow the movement of the second mounting base;
(j) a remote control base physically separated from said control unit; and,
(k) said remote control base electrically connecting with said control unit to electrically operate said control unit.

6. A control unit, said control unit comprising:
(a) a first mounting base and a second mounting base;
(b) said first and second mounting bases adapted to move substantially vertically;
(c) switching means mounted on one of said mounting bases and a switch actuator means mounted on the other one of said mounting bases;
(d) means to hold the first mounting base in a fixed position while the second mounting base moves;
(e) means to allow the first mounting base to move substantially vertically downward to follow the movement of the second mounting base;
(f) a remote control base physically separated from said control unit; and,
(g) said remote control base electrically connecting with said control unit to electrically operate said control unit.

7. A control unit, said control unit comprising:
(a) a first mounting base and a second mounting base;
(b) said first and second mounting bases adapted to move substantially vertically;
(c) a variable resistance mounted on one of said mounting bases and a wiper mounted on the other one of said mounting bases;
(d) means to hold the first mounting base in a fixed position while the second mounting base moves;
(e) means to allow the first mounting base to move substantially vertically downward to follow the movement of the second mounting base;
(f) a remote control base physically separated from said control unit; and,
(g) said remote control base electrically connecting with said control unit to electrically operate said control unit.

8. A control unit for a sawmill setworks, said control unit comprising:
(a) a substantially vertical guide;
(b) a first mounting base adapted to be guided by said vertical guide;
(c) a second mounting base adapted to be guided by said first mounting base;
(d) said second mounting base comprising a rod;
(e) a first means connecting the rod to the setshaft of the sawmill setworks so that the rod moves in response to the movement of the setshaft;
(f) a second means for firmly positioning the first mounting base with respect to the vertical guide so that the rod can move;
(g) said second means being released from said vertical guide so as to allow the first mounting base to move downwardly with respect to the second mounting base;
(h) switching means mounted on one of said mounting bases; and,
(i) a switch actuator means mounted on the other of said mounting bases.

9. a combination of a sawmill carriage and a control unit, said sawmill carriage comprising:
(a) knees;
(b) a setshaft;
(c) a first means by which the setshaft moves the knees;
(d) said control unit comprising a substantially vertical guide;
(e) a first mounting base adapted to be guided by said vertical guide;
(f) a second mounting base adapted to be guided by said first mounting base;
(g) said second mounting base comprising a rod;
(h) a first means connecting the rod to the setshaft of the sawmill carriage so that the rod moves in response to the movement of the setshaft;
(i) a second means for firmly positioning the first mounting base with respect to the vertical guide so that the rod can move;
(j) said second means being released from said vertical guide so as to allow the first mounting base to move downwardly with respect to the second mounting base;
(k) switching means mounted on one of said mounting bases; and,
(l) a switch actuator means mounted on the other of said mounting bases.

10. a control unit for a sawmill setworks, said control unit comprising:
(a) a substantially vertical guide;
(b) a first mounting base adapted to be guided by said vertical guide;
(c) a second mounting base adapted to be guided by said first mounting base;
(d) said second mounting base comprising a rod;
(e) a first means connecting the rod to the setshaft of the sawmill setworks so that the rod moves in response to the movement of the setshaft;
(f) a second means for firmly positioning the first mounting base with respect to the vertical guide so that the rod can move;
(g) said second means being released from said vertical guide so as to allow the first mounting base to move downwardly with respect to the second mounting base;
(h) a variable resistance mounted on one of said mounting bases; and,
(i) a wiper mounted on the other one of said mounting bases.

11. A combination of a sawmill carriage and a control unit, said sawmill carriage comprising:
(a) knees;
(b) a setshaft;
(c) a first means by which the setshaft moves the knees;
(d) said control unit comprising a substantially vertical guide;
(e) a first mounting base adapted to be guided by said vertical guide;
(f) a second mounting base adapted to be guided by said first mounting base;
(g) said second mounting base comprising a rod;
(h) a first means connecting the rod to the setshaft of the sawmill carriage so that the rod moves in response to the movement of the setshaft;
(i) a second means for firmly positioning the first mounting base with respect to the vertical guide so that the rod can move;
(j) said second means being released from said vertical guide so as to allow the first mounting base to move downwardly with respect to the second mounting base;

(k) a variable resistance mounted on one of said mounting bases; and
(l) a wiper mounted on the other one of said mounting bases.

12. A control unit, said control unit comprising:
(a) a first mounting base and a second mounting base;
(b) electrical circuit means mounted on one of said mounting bases and an actuator for said electrical circuit means mounted on the other one of said mounting bases;
(c) means to hold the first mounting base in a fixed position while the second mounting base moves;
(d) means to regulate the movement of the first mounting base with respect to the movement of the second mounting base;
(e) a remote control base physically separated from said control unit; and,
(f) said remote control base electrically connecting with said control unit to electrically operate said control.

13. A control unit, said control unit comprising:
(a) a first mounting base and a second mounting base;
(b) switching means mounted on one of said mounting bases and a switch means actuator means mounted on the other one of said mounting bases;
(c) means to hold the first mounting base in a fixed position while the second mounting base moves;
(d) means to regulate the movement of the first mounting base with respect to the movement of the second mounting base;
(e) a remote control base physically separated from said control unit; and,
(f) said remote control base electrically connecting with said control unit to electrically operate said control unit.

14. A control unit for a sawmill setwork, said control unit comprising:
(a) a first mounting base and a second mounting base;
(b) said first mounting base being attached to a knee of the carriage;
(c) said second mounting base supported on the setworks
(d) a first means to fixedly position the second mounting base on the setworks so that the first mounting base can move without moving the second mounting base;
(e) means to move the second mounting base with respect to the first mounting base so that the second mounting base follows the movement of the first mounting base;
(f) a plurality of switch support means and switches mounted on one of said mounting bases; and,
(g) a switch actuator means mounted on the other one of said mounting bases.

15. A combination of a sawmill carriage and a control unit, said sawmill carriage comprising:
(a) knees;
(b) a setshaft;
(c) a first means by which the setshaft moves the knees;
(d) said control unit comprising a first mounting base and a second mounting base;
(e) said first mounting base being attached to a knee of the carriage;
(f) said second mounting base supported on the setworks;
(g) a first means to fixedly position the second mounting base on the setworks so that the first mounting base can move without moving the second mounting base;
(h) means to move the second mounting base with respect to the first mounting base so that the second mounting base follows the movement of the first mounting base;
(i) a plurality of switch support means and switches mounted on one of said mounting bases; and,
(j) a switch actuator means mounted on the other one of said mounting bases.

16. A control unit, said control unit comprising:
(a) a first mounting base and a second mounting base;
(b) a variable resistance mounted on one of said mounting bases and a wiper mounted on the other of said mounting bases;
(c) means to hold the first mounting base in a fixed position while the second mounting base moves;
(d) means to regulate the movement of the first mounting base with respect to the movement of the second mounting base;
(e) a remote control base physically separated from said control unit; and,
(f) said remote control base electrically connecting with said control units to electrically operate said control unit.

17. A control unit for a sawmill setworks, said control unit comprising:
(a) a first mounting base and a second mounting base;
(b) said first mounting base being attached to a knee of the carriage;
(c) said second mounting base supported on the setworks;
(d) a first means to fixedly position the second mounting base on the setworks so that the first mounting base can move without moving the second mounting base;
(e) means to move the second mounting base with respect to the first mounting base so that the second mounting base follows the movement of the first mounting base;
(f) a variable resistance mounted on one of said mounting bases; and,
(g) a wiper mounted on the other one of said mounting bases.

18. A combination of a sawmill carriage and a control unit, said sawmill carriage comprising:
(a) knees;
(b) a setshaft;
(c) a first means by which the setshaft moves the knees;
(d) said control unit comprising a first mounting base and a second mounting base;
(e) said first mounting base being attached to a knee of the carriage;
(f) said second mounting base supported on the setworks;
(g) a first means to fixedly position the second mounting base on the setworks so that the first mounting base can move without moving the second mounting base;
(h) means to move the second mounting base with respect to the first mounting base so that the second mounting base follows the movement of the first mounting base;
(i) a variable resistance mounted on one of said mounting bases; and
(j) a wiper mounted on the other one of said mounting bases.

19. A control unit for a sawmill setworks, said control unit comprising:
(a) a first mounting base and a second mounting base;
(b) said first mounting base being attached to a knee of the carriage;
(c) said second mounting base supported on the setworks;
(d) a first means to fixedly position the second mounting base on the setworks so that the first mounting base can move without moving the second mounting base;

(e) means to move the second mounting base with respect to the first mounting base so that the second mounting base follows the movement of the first mounting base;
(f) switching means mounted on one of said mounting bases; and
(g) a switch actuator means mounted on the other of said mounting bases.

20. A control unit for a sawmill setworks, said control unit comprising:
(a) a first mounting base and a second mounting base;
(b) said first mounting base being attached to a knee of the carriage;
(c) said second mounting base supported on the setworks;
(d) a first means to fixedly position the second mounting base on the setworks so that the first mounting base can move without moving the second mounting base;
(e) means to move the second mounting base with respect to the first mounting base so that the second mounting base follows the movement of the first mounting base;
(f) switching means mounted on one of said mounting bases and a switch actuator means mounted on the other one of said mounting bases;
(g) said switching means being in an electrical circuit for controlling a driving means for the setshaft;
(h) said switching means comprising a series of switches;
(i) an arm for contacting the switches;
(j) said switches being in a circuit for controlling the driving means;
(k) said switch actuator means in the initial position closing the circuit to the control for the driving means so as to bypass the arm and opening a circuit containing the switches and the arm;
(l) said switch actuator means upon moving from its initial position closing the circuit containing the switches and the arm and opening said circuit which bypassed the switches and the arm; and,
(m) said switch actuator means upon further movement opening one of said switches so as to open said circuit controlling the driving means for the setshaft.

21. A combination of sawmill carriage and a control unit, said sawmill carriage comprising:
(a) knees;
(b) a setshaft;
(c) a first means by which the setshaft moves the knees;
(d) said control unit comprising a first mounting base and a second mounting base;
(e) said first mounting base being attached to a knee of the carriage;
(f) said second mounting base supported on the setworks;
(g) a first means to fixedly position the second mounting base on the carriage so that the first mounting base can move without moving the second mounting base;
(h) means to move the second mounting base with respect to the first mounting base so that the second mounting base follows the movement of the first mounting base;
(i) switching means mounted on one of said mounting bases and a switch actuator means mounted on the other one of said mounting bases;
(j) said switching means being in an electrical circuit for controlling a driving means for the setshaft;
(k) said switching means comprising a series of switches;
(l) an arm for contacting the switches;
(m) said switches being in a circuit for controlling the driving means;
(n) said switch actuator means in the initial position closing the circuit to the control for the driving means so as to bypass the arm and opening a circuit containing the switches and the arm;
(o) said switch actuator means upon moving from its initial position closing the circuit containing the switches and the arm and opening said circuit which bypassed the switches and the arm; and,
(p) said switch actuator means upon further movement opening one of said switches so as to open said circuit controlling the driving means for the setshaft.

22. A control unit for a sawmill setworks, said control unit comprising:
(a) a first mounting base and a second mounting base;
(b) said first mounting base being attached to a knee of the carriage;
(c) said second mounting base supported on the setworks;
(d) a first means to fixedly position the second mounting base on the setworks so that the first mounting base can move without moving the second mounting base;
(e) switching means mounted on one of said mounting bases; and,
(f) a switch actuator means mounted on the other of said mounting bases.

23. A combination of a sawmill carriage and a control unit, said sawmill carriage comprising:
(a) knees;
(b) a setshaft;
(c) a first means by which the setshaft moves the knees;
(d) said control unit comprising a first mounting base and a second mounting base;
(e) said first mounting base being attached to the knee of the carriage and comprising a rod;
(f) said second mounting base being supported on the carriage and comprising a housing;
(g) said housing having a longitudinal slot therein;
(h) a series of switches juxtapositioned to said slot;
(i) said rod being in said housing;
(j) a switch actuator means on said rod and projecting through said slot to contact said switches;
(k) said control unit being on said sawmill carriage;
(l) a remote control base physically separated from said control unit and from said sawmill carriage; and,
(m) said remote control base electrically connecting with said control unit to electrically operate said control unit.

24. A control unit, said control unit comprising:
(a) an electrical circuit;
(b) said circuit comprising a series of switching means;
(c) an arm for contacting the switching means;
(d) said switches being in a control circuit;
(e) a switch actuator means for activating the switching means; and,
(f) said switch actuator means functioning in response to a condition initiated by the control circuit.

25. A control, said control comprising an electrical circuit having a switch, a series of variable resistances, at least one of said variable resistances controlling said switch in a first state, a main variable resistance acting in opposition to said one of said variable resistances with respect to controlling said switch, said main variable resistance acting in response to a condition under the control of said electrical circuit, and said main variable resistance in response to said condition opposing said one of said variable resistances so as to change said switch to a second state.

26. A control unit for a sawmill setworks, said control unit comprising:
(a) a substantially vertical guide;
(b) a first mounting base adapted to be guided by said vertical guide;

(c) a second mounting base adapted to be guided by said first mounting base;
(d) said second mounting base comprising a rod;
(e) a first means connecting the rod to the setshaft of the sawmill setworks so that the rod moves in response to the movement of the setshaft;
(f) a second means for firmly positioning the first mounting base with respect to the vertical guide so that the rod can move;
(g) said second means being released from said vertical guide so as to allow the first mounting base to move downwardly with respect to the second mounting base;
(h) switching means mounted on one of said mounting bases and a switch actuator means mounted on the other one of said mounting bases;
(i) said switching means being in an electrical circuit for controlling a driving means for the setshaft;
(j) said switching means comprising a series of switches;
(k) an arm for contacting the switches;
(l) said switches being in a circuit for controlling the driving means;
(m) said switch actuator means in the initial position closing the circuit to the control for the driving means so as to bypass the arm and opening a circuit containing the switches and the arm;
(n) said switch actuator means upon moving from its initial position closing the circuit containing the switches and the arm and opening said circuit which bypassed the switches and the arm; and,
(o) said switch actuator means upon further movement opening one of said switches so as to open said circuit controlling the driving means for the setshaft.

27. A control unit for a sawmill setworks, said control unit comprising:
(a) a substantially vertical guide;
(b) a first mounting base adapted to be guided by said vertical guide;
(c) a second mounting base adapted to be guided by said first mounting base;
(d) said second mounting base comprising a rod;
(e) a first means connecting the rod to the setshaft of the sawmill setworks so that the rod moves in response to the movement of the setshaft;
(f) a second means for firmly positioning the first mounting base with respect to the vertical guide so that the rod can move;
(g) said second means being released from said vertical guide so as to allow the first mounting base to move downwardly with respect to the second mounting base;
(h) a main variable resistance mounted on one of said mounting bases and a wiper mounted on the other one of said mounting bases;
(i) said main variable resistance being in a control circuit comprising a series of variable resistances and a thyratron;
(j) at least one of said variable resistances functioning to maintain the thyratron in a first state;
(k) said control circuit controlling the movement of the setshaft;
(l) said main variable resistance functioning to oppose said one of said variable resistances so as to change said thyratron from the first state to a second state; and,
(m) the relative position of said wiper and said main variable resistance being varied so that the main variable resistance sufficiently opposes said one of said variable resistances to change the thyratron from the first state to the second state so as to stop the movement of the setshaft.

References Cited
UNITED STATES PATENTS 2,597,355  5/1952  Masuy _____ 143—120

WILLIAM W. DYER, Jr., *Primary Examiner.*

WAYMOND D. BRAY, *Assistant Examiner.*